Figure 1:
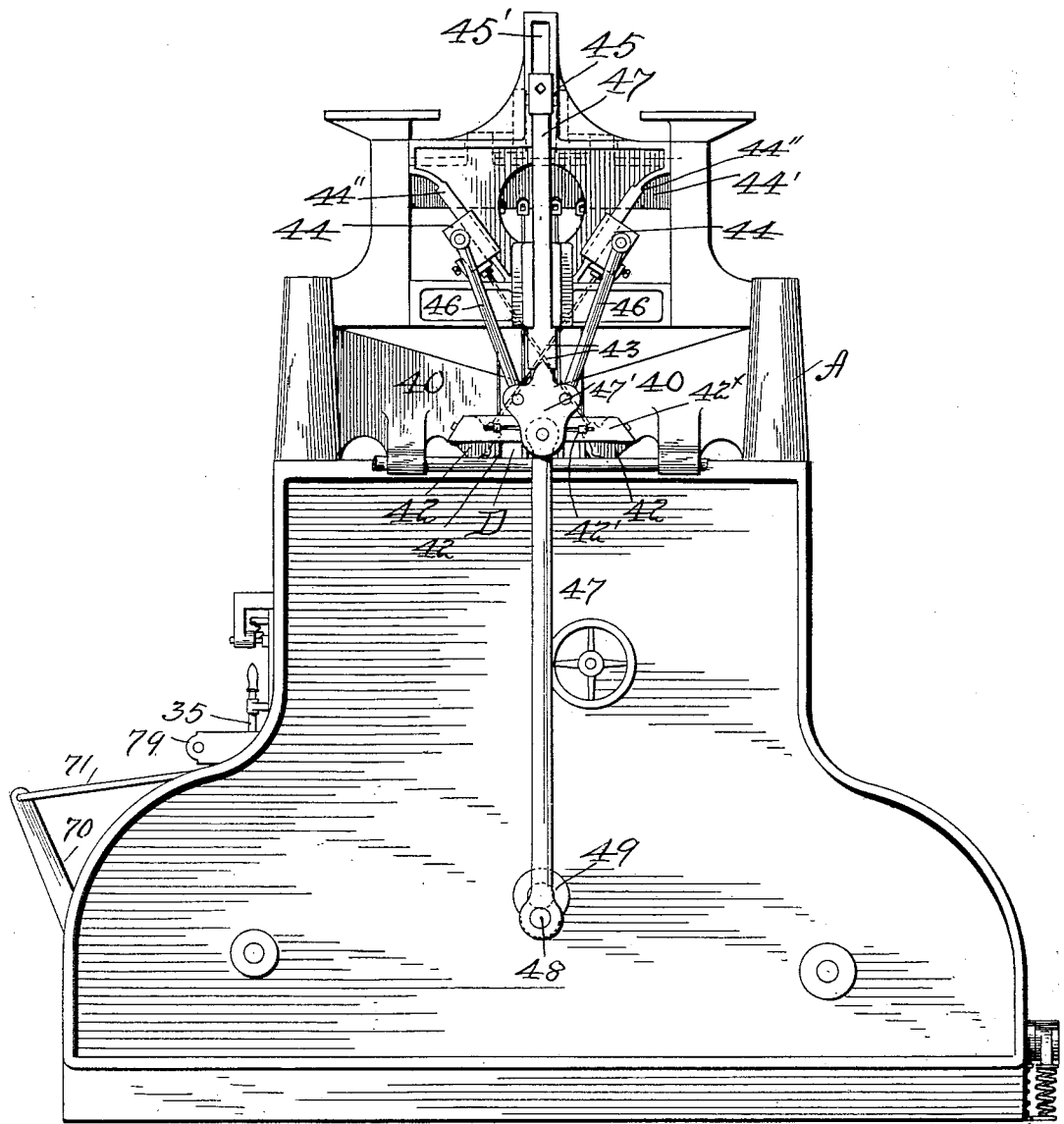

No. 614,721. Patented Nov. 22, 1898.
T. J. HUMPHREY.
MACHINE FOR COMPRESSING TOBACCO AND SECURING IT IN BOXES.
(Application filed Feb. 17, 1898.)

(No Model.) 6 Sheets—Sheet 1.

Attest
Walter Donaldson
C. S. Middleton

Inventor
Thomas J. Humphrey
by Ellis Spear
Atty.

No. 614,721. Patented Nov. 22, 1898.
T. J. HUMPHREY.
MACHINE FOR COMPRESSING TOBACCO AND SECURING IT IN BOXES.
(Application filed Feb. 17, 1898.)
(No Model.) 6 Sheets—Sheet 2.
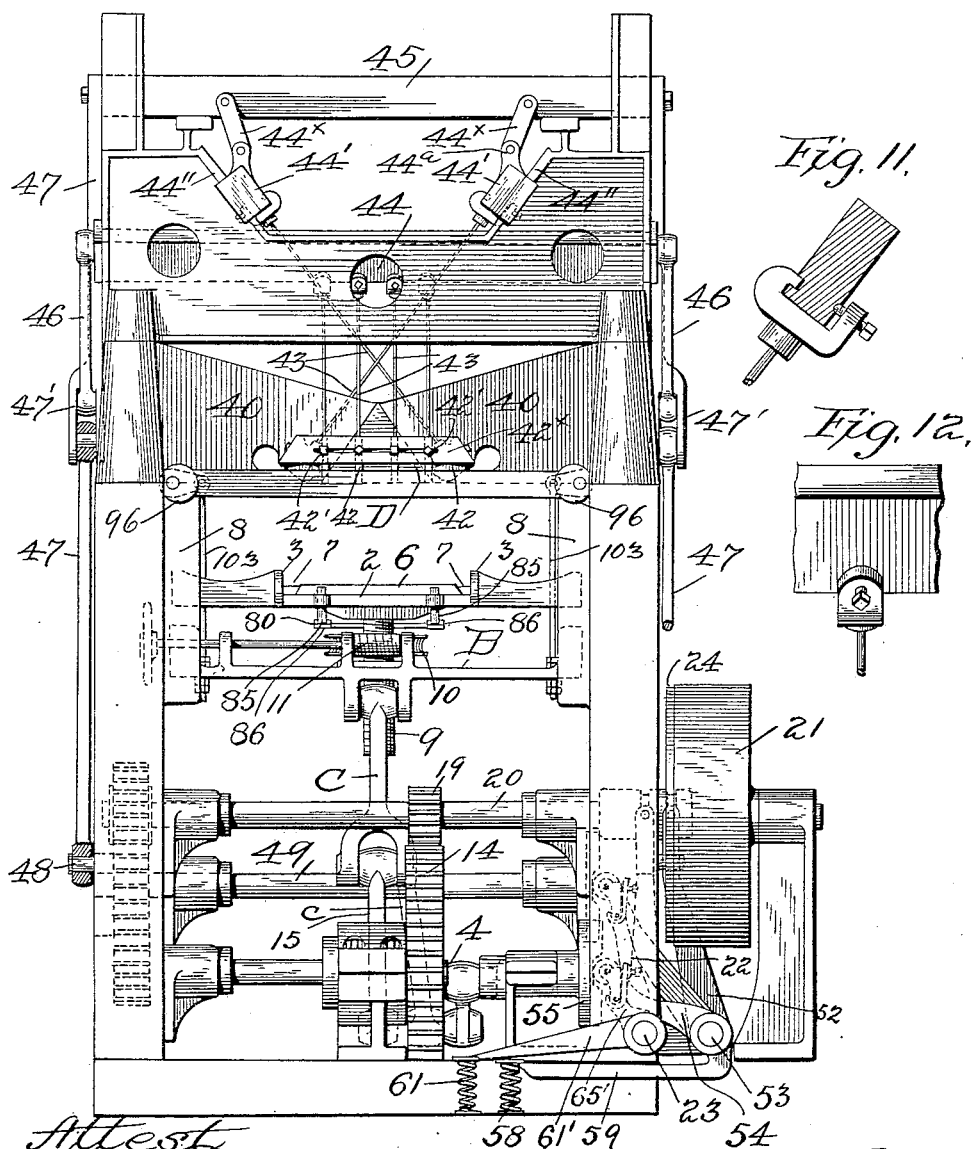

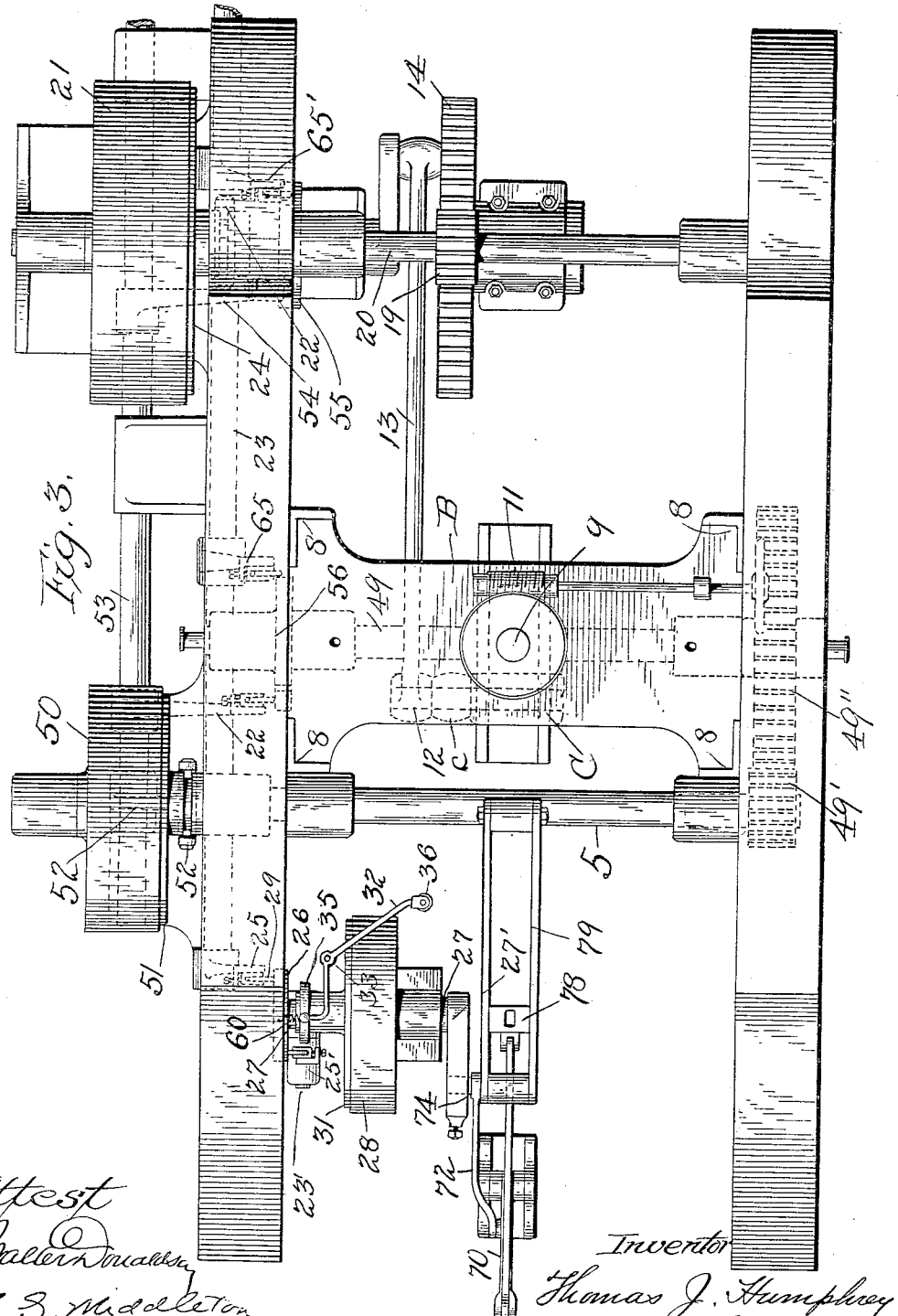

No. 614,721. Patented Nov. 22, 1898.
T. J. HUMPHREY.
MACHINE FOR COMPRESSING TOBACCO AND SECURING IT IN BOXES.
(Application filed Feb. 17, 1898.)
(No Model.) 6 Sheets—Sheet 4.
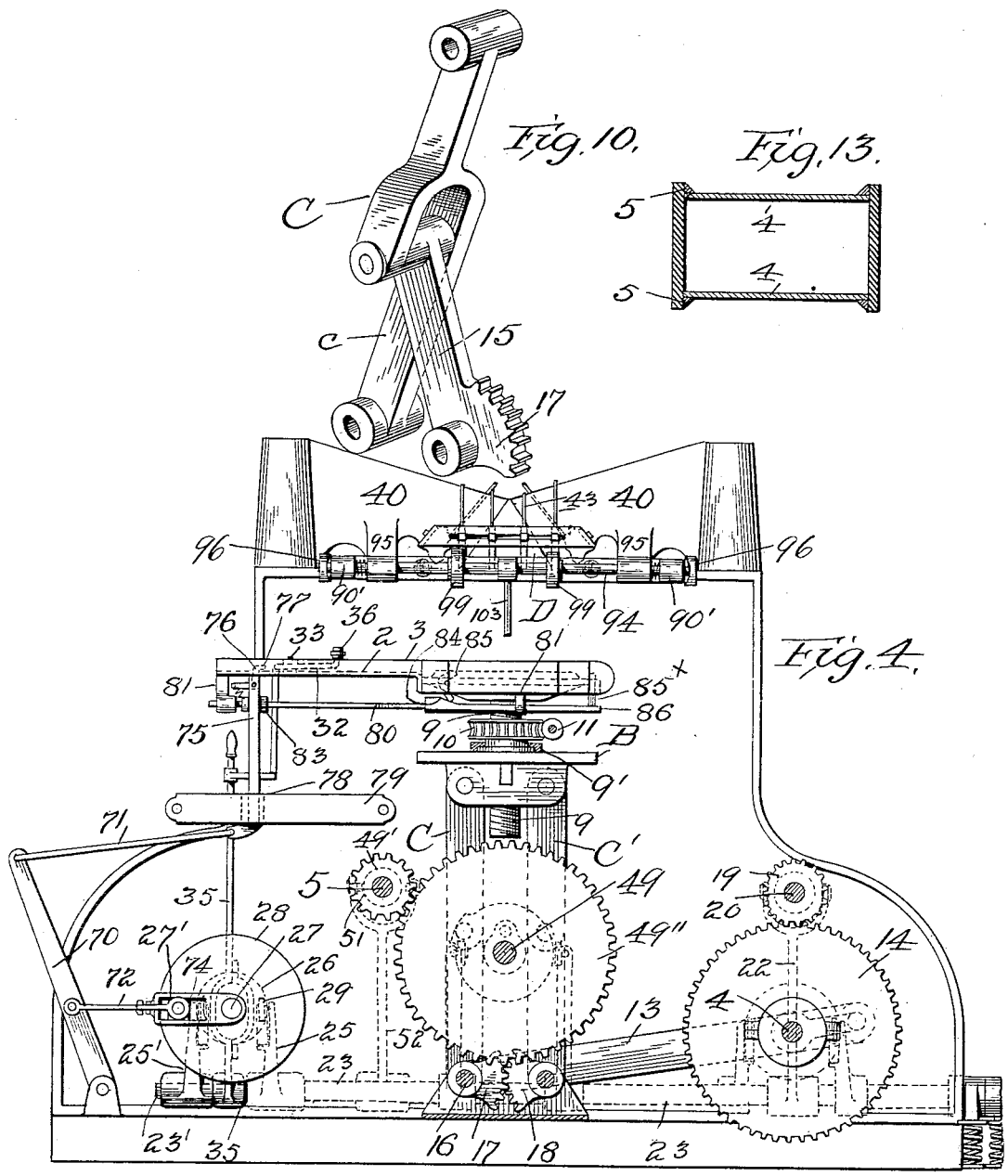

No. 614,721. Patented Nov. 22, 1898.
T. J. HUMPHREY.
MACHINE FOR COMPRESSING TOBACCO AND SECURING IT IN BOXES.
(Application filed Feb. 17, 1898.)
(No Model.) 6 Sheets—Sheet 5.
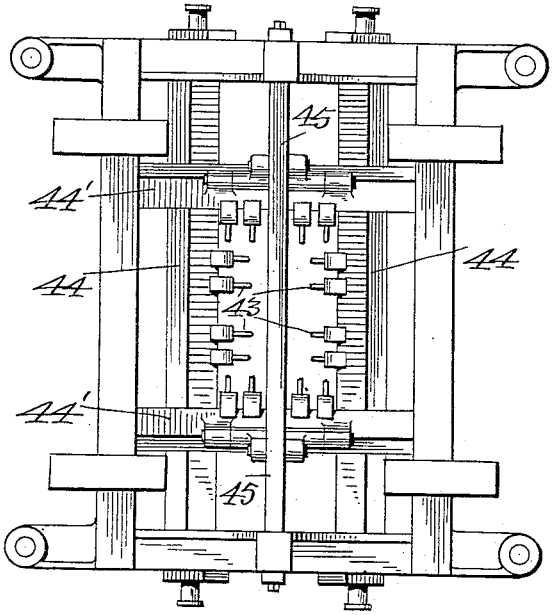
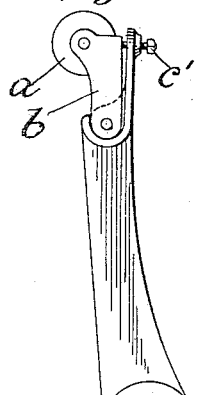
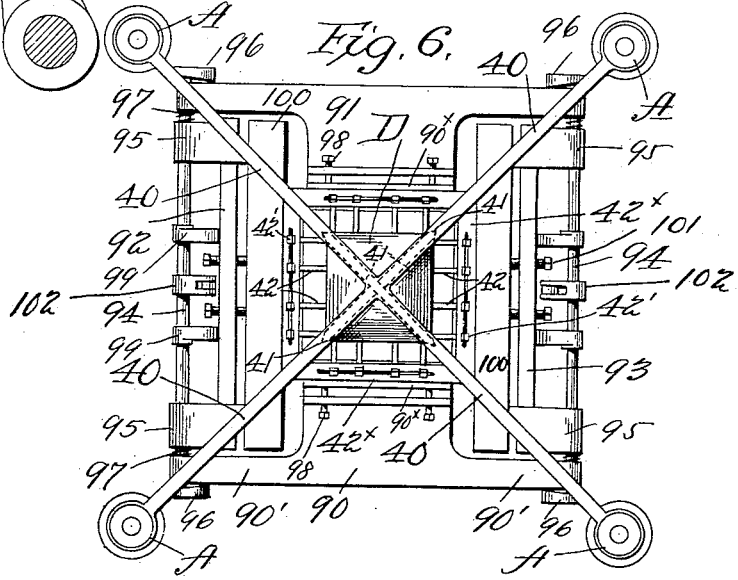
Attest
Waller Donaldson
C. S. Middleton
Inventor
Thomas J. Humphrey
by Ellis Spear
Atty No. 614,721. Patented Nov. 22, 1898.
T. J. HUMPHREY.
MACHINE FOR COMPRESSING TOBACCO AND SECURING IT IN BOXES.
(Application filed Feb. 17, 1898.)
(No Model.) 6 Sheets—Sheet 6.
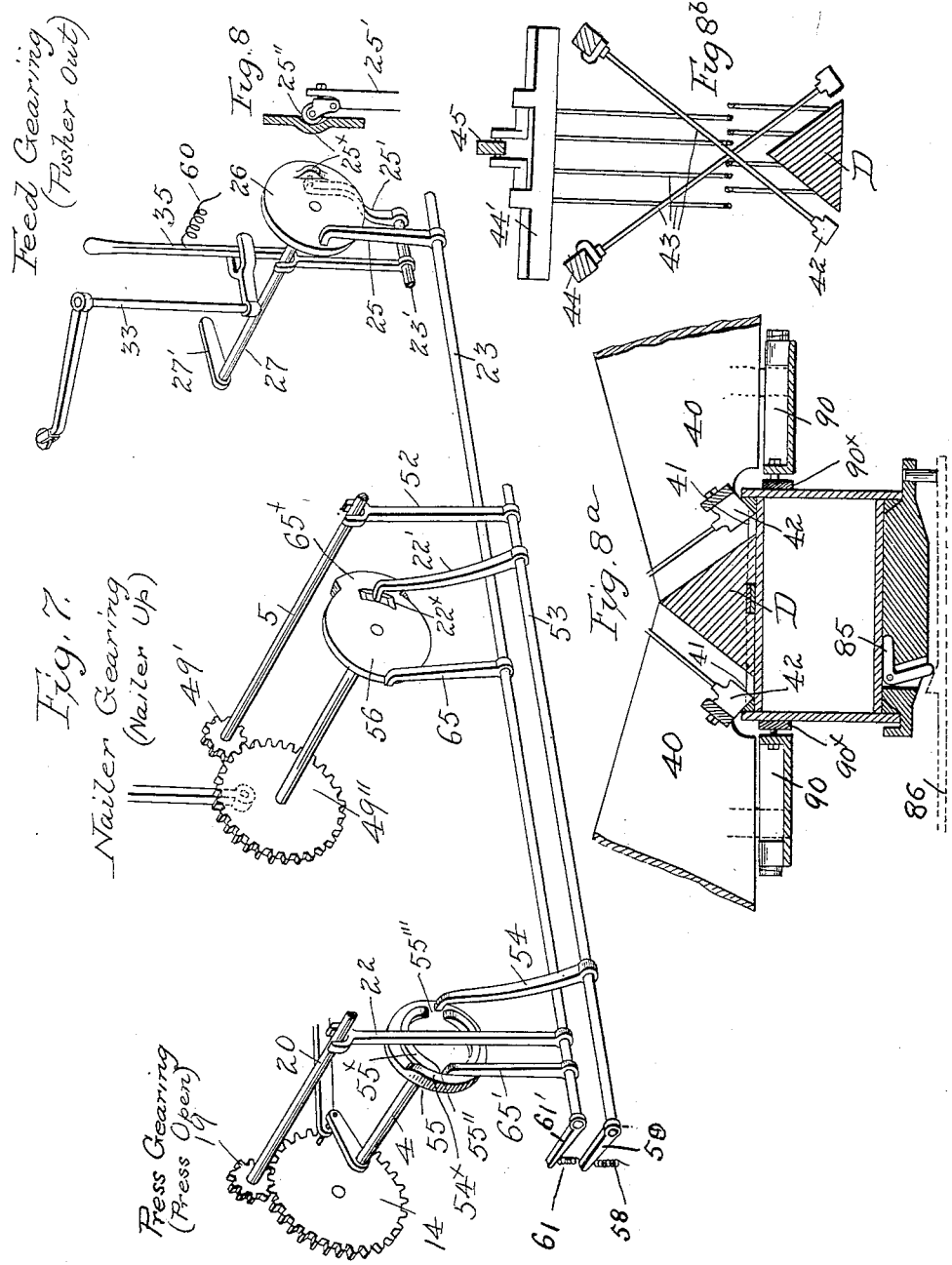

UNITED STATES PATENT OFFICE.

THOMAS J. HUMPHREY, OF ST. LOUIS, MISSOURI.

MACHINE FOR COMPRESSING TOBACCO AND SECURING IT IN BOXES.

SPECIFICATION forming part of Letters Patent No. 614,721, dated November 22, 1898.

Application filed February 17, 1898. Serial No. 670,648. (No model.)

*To all whom it may concern:*

Be it known that I, THOMAS J. HUMPHREY, a citizen of the United States, residing at St. Louis, in the State of Missouri, have invented certain new and useful Improvements in Machines for Compressing Tobacco and Securing It in Boxes, of which the following is a specification.

My invention relates to the packing of tobacco in boxes and includes mechanism for compressing the tobacco in the box and securing the cover thereon while the tobacco is held under pressure in the machine.

Heretofore it has been customary to compress the tobacco after it had been packed in the box and then hold it under compression a length of time sufficient to allow the tobacco to set and retain its bulk without expansion when released from the press. Then the pressure is removed and the cover is secured in place.

The machine which includes my invention is designed to facilitate the work by securing the cover in place at the instant when the press has condensed the mass of tobacco to the point where the cover may be secured in its proper place, thus saving the delay incident to the old method and saving not only time but labor.

My machine includes as its characteristic features means for exerting a pressure on the head of the box to compress the tobacco and means for nailing the lining-strips in place while the head is held under pressure and the tobacco compressed, the said lining-strips having been placed in position on the head when the box is fed into the machine.

My invention is illustrated in the accompanying drawings, in which—

Figure 1 is a side elevation of the machine with the clamping-bar and operating means therefor omitted. Fig. 2 is an end elevation of the machine, showing a part thereof in section. Fig. 3 is a plan view of the machine with the box-feeding table omitted. Fig. 4 is a detail elevation with one of the side frames removed. Fig. 5 is a detail of the driving-rod carriers. Fig. 6 is a detail plan view of the platen and pressure-bar and adjacent mechanism. Fig. 7 is a perspective view in the nature of a diagram, showing the cams for starting and controlling the actions of the several trains of mechanism. Fig. 8 is a view of a detail. Fig. 8$^a$ is a detail sectional view. Fig. 8$^b$ is a detail view showing the arrangement of nail-drivers. Figs. 9, 10, 11, and 12 are detail views. Fig. 13 is a detail sectional view of one of the boxes.

In this machine boxes filled with tobacco, with the cover or end to be secured, are received on a table, along which they are moved to the center of the machine to rest on the platen. This platen acts in conjunction with an upper fixed part, which acts as a bed, and between these (the platen and the bed) the upper head of the box is forced toward the lower head into proper position for the nailing. The fixed part or bed contains the nailing mechanism, which is automatically caused to operate while the tobacco with the head held thereon is under compression. After the nailing the box is released and the parts return to their proper position for renewed operation.

The details of construction are as follows: A guideway or table 2 on the front of the machine (the left side of Fig. 4) is fitted to receive the box. It has sides 3, between which the box slides. Tobacco-boxes are usually made as shown in Fig. 13. The heads 4 set into the sides and ends below their edges to leave space all around for what are called the "linings" 5, in which the nails are driven diagonally into the sides and ends. It will be understood that the bottom or lower head is nailed in place before the tobacco is put therein, and only the upper head is required to be nailed. So constructed and filled the box is placed upon the guideway 2 and pushed between the sides onto a seat 6. This is flush with the table on which the box slides, but is beveled on its four edges. The front bevel leaves a groove between the seat and the table, and the side bevel leaves grooves next the side walls, as shown at 7 in Fig. 2. The rear bevel is open to the rear to allow the box to move back when completed. These bevels fit the under linings, and when the box has reached its position on the seat it drops into place, with the lower head resting on the seat and the linings in the grooves, and is firmly and fully supported to receive the pressure. For giving this pressure the whole platen with the seat and way is moved The platen has lateral extensions engaging guides 8 on the frame, so as to move vertically therein. A cross-head B below the platen is similarly guided and is connected to the platen by a strong screw-standard 9, which is fixed to the platen. The threaded standard extends down through the cross-head and carries threaded thereon a worm-wheel 10, which rests on the upper side of B, being swiveled thereto by the socket-piece 9', so that when the worm-wheel is turned the platen is raised or lowered in relation to the cross-head to accommodate different sizes of box. The worm-wheel is operated by means of a worm 11, which is worked by a rod and hand-wheel, having bearings in standards in the cross-head. Force is applied to raise the seat and apply the pressure by means of toggle-levers. (Shown detached and in place in Figs. 4 and 10.) A pair of these toggles is used, and each consists of a forked lever, the upper ends of both of which are pivoted to lugs in the under side of the cross-head B. Forked lever C has a downwardly-extending part c, on which is a pin 12, and to this is pivoted the end of a pitman 13, connected to a wrist-pin on the gear-wheel 14. In the fork is pivoted a lever 15, the lower end of which is pivoted by pin 16 in the frame and has a segment 17, meshing with a segment 18 on the companion toggle-lever C', which is like that just described, lacking only the extension c. These operate like ordinary toggles by the pull of the pitman 13 and raise or lower the cross-head and platen.

The automatic operation of the machine requires that the cog-wheel 14 be set in motion at the proper time. The wheel 14 is driven by a pinion 19 on the driving-shaft 20 through the pulley 21. Normally pulley 21 runs loose and is connected to the shaft by a clutch mechanism. (Shown more clearly in Figs. 2 and 3.) An arm 22 on a rock-shaft 23 operates a friction-clutch disk 24, splined on the shaft 20. This shaft is rocked by means of an arm 25 on the rock-shaft 23. Arm 25 bears on a cam-wheel 26, which is on shaft 27, driven by pulley 28, normally loose on said shaft. This cam-wheel has cam-faces. The outside face has a short high part or hump $25^\times$ (see Fig. 7) for operating the arm 25, the end of which bears on the cam through a wheel 29. The hump is so located on the cam as to throw the arm out and rock the shaft 23 to throw the clutch in after the box has been fed to its seat, and when this action takes place the rock-shaft 23, with the clutch-arm 22, is held in this position by the arm 65' bearing on the high part $55^\times$ of the cam 55 on the shaft 4, and the clutch is held a length of time sufficient to give the wheel 14 one half-revolution, which half-revolution is used to work the toggle-levers to force up the box against the platen and compress the contents. The hump $25^\times$, Fig. 7, is only long enough to throw the clutch 24 to start the compression train of mechanism. Normally the holding-arm 65' rests against the depressed part $55''$ of the cam 55; but as soon as the cam begins to turn when the clutch 24 is thrown in the holding-arm 65' is moved by the high part $55^\times$ to hold the clutch in for one-half a revolution of the cam and gear 14. In order to set these mechanisms in motion at the proper time, I provide means operated by the entrance of the box itself. It will be understood that the pulley 28 is running constantly at the proper speed, but loose. It is held to the shaft at the proper intervals by means of a friction-clutch 31, which is operated by lever 32, pivoted at 33. The free end of this lever projects through the side wall of the guideway or table. Its lower end slides on the lever 35, which directly moves the clutch, so that it may move up and down with the table. The end of the lever 32 which projects into the path of the box carries a friction-roller 36 and is pushed aside by the box, thus operating the train, as above described. In order to hold the lever 35 in position to keep the clutch 31 engaged for a proper length of time, the said lever is fixed to its pivot-pin 23', which also carries the arm 25', and this latter arm carries a roller to bear on the inner face of the cam 26, and as long as this lever-arm 25' is operated upon by the high part of the cam the clutch 31 will be held in and the shaft 27 will be revolved through the pulley 28. When the machine is at rest, the roller of the lever 25' lies in a depression $25''$ in the face of the cam 26, directly opposite the hump $25^\times$, Figs. 7 and 8, and as soon as the cam begins to turn this roller rides upon the plain surface of the cam, which is, relatively speaking, the high part. As before stated, parts are so timed that the cam 26 rocks the shaft 23 and operates the clutch 24 and sets thereby the wheel 14 in motion at the instant when the box is seated in its place. The toggle-levers then raise the platen and box. The cover or head thereof comes into contact with the bed above and is pressed down into place between the sides and ends and far enough to sink the linings (which have previously been laid in place on the cover or head) until they are flush with or below the edges of the box. In this position the box is held under compression and with the covering-head in place while the nailing operation is performed.

The fixed part or bed which bears the strain of the upwardly-pressed platen and box is shown at D. It is held on diagonal arms 40, fixed on the corner-posts A. It is of the shape of the box and is fitted to close upon the head inside of the linings. In its lower face are diagonal bars fixed and extending slightly beyond the corners, as shown in dotted lines at 41, the ends of the bars being beveled to fit over the linings at their united junction. At their intermediate parts the upper surfaces of the linings are uncovered and exposed to the nailing-boxes 42. These are shown in side view in Fig. 1 and in top view in Fig. 6. They are clamped on the under side of bars 42×, which are fixed upon the diagonal bars 40. They are slotted, and set-screws 42', passing through the slots into the backs of the boxes, secure them adjustably in place. Driving-rods 43 reciprocate diagonally in holes in these boxes and operate to drive the nails through the linings diagonally into the sides of the box. The nails are fed into openings leading into the narrow passages of the nail-boxes in which the driving-rods work.

The feeding mechanism for the nails may be of any desired construction, such mechanism being well known.

The driving-rods or nailing-hammers 43 are carried by cross-heads 44 and 44', there being four of these cross-heads and each carrying four nail-hammers or rods, so that sixteen nails will be driven at once, four into each of the four sections of the lining. The heads 44 move on the inclined ways 44'' on the upper framework of the machine, and the hammers carried by said head move along inclined planes. These cross-heads 44 are reciprocated through links 46, pivoted thereto, and pivoted also in the fork 47' of jointed pitman 47, one on each side of the machine. The other cross-heads 44' are operated through the links 44×, pivoted to ears 44ª on the cross-heads, said links being pivoted to the cross-bar 45, moving in guide-slots 45' in the upper framework and connected with the upper ends of the jointed pitmen 47. These pitmen are operated by crank-pins 48 on the shaft 49. This shaft is driven by gears 49' 49'' from the shaft 5, which carries the pulley 50. This pulley runs normally free, but is connected to its shaft at the proper instant by friction-clutch 51, operated by an arm 52 on the rock-shaft 53. Shaft 53 is operated first to start the train of nailing mechanism by the cam 55 on the slow-moving press-shaft 4. On the face of this cam bears the arm 54. A high part 54× of the cam is set to operate the arm 54 at the instant when the box is sufficiently compressed and is ready for nailing. It puts the clutch 51 into connection with the pulley 50 and sets in motion the shaft 5, which through the gearing 49' 49'' sets in motion the shaft 49, which carries the wrist-pins which operate on the pitmen 47 and links 46 and operate with quick motion the nailing devices. For this purpose the shaft 49 must make a complete revolution—that is, to drive the nails and return the nailing devices to their normal position. In order that this may be done, the high part or hump 54× of the cam 55 need only be long enough to operate the arm 54 and clutch-pulley 50, which is thus accomplished once on each revolution of the press-shaft. The clutch 51 thus caused to engage by cam 55 is held during the entire revolution of shaft 49 by a cam 56 on the shaft 49, the plain face or relative high part of which acts upon the arm 22' and holds the clutch in engagement during the remainder of the revolution of that cam and while the driving mechanism advances and retreats, and then the friction-roller on the end of said arm drops back into the low part or depression 22× in the cam-face, and the clutch is instantly retracted by means of a spring 58, bearing on an arm 59 on the rock-shaft 53. It will be understood that the other clutches are retracted in the same manner. Clutch 24 is released by spring 61 and arm 61', connected with the shaft 23, and clutch 31 is released by spring 60.

It will be borne in mind that by a half-revolution of the short slow-moving press-shaft 4 the pressure is applied and held during the operation of the nailing devices—that is, while the depression 55''' on the cam 55 is moving from its position on the right, Fig. 7, one-half way around, when the arm 65' is released, together with the clutch 24, thus stopping the platen in its elevated position. In order to return the platen, which carries the box to its normal position, and to bring the parts into position for a repeated operation, a further half-revolution of this shaft 4 is required. For this I have provided a second arm 65 on the rock-shaft 23, which during the nailing operation is not in contact with the cam 56. At the end of the nailing operation, however, the arm 65 rides on a flange 65× of the cam 56 and again rocks shaft 23 and throws the clutch 24 and there holds it long enough to spread the toggle-levers and retract the press-table, and when this is done the machine is in position to repeat the operation. The entrance of another box upon the seat starts again the machine and pushes off the box completed by the previous operation.

The arms operated by the cams have friction-wheels, as at $a$, Fig. 9, which are set in pivoted extensions $b$ and are adjustable by set-screws $c'$.

The exact operation of the machine requires that the box be set exactly in place on the seat. For this purpose I have provided a feeding mechanism. (Shown in Fig. 4.) This consists of a lever 70, pivoted at its lower end and connected by a rod 72 adjustably to a block 74, which is operated by a crank-arm 27' on the shaft 27. Lever 70 is connected to a block 78, which slides in a way 79. The block carries an arm 75, on the upper end of which is a trigger 76, the finger 77 of which tips to let the box slide over it, and when the arm advances pushes the box to its seat. The mechanism is adjusted to accurately place the box. The arm 75 slides in a vertical hole in the block 78, so as to allow the table to move vertically without disarranging the finger.

In order to insure the proper discharge of a completed box and the proper seating of a fresh box to be nailed, I employ a slide-frame 80, Figs. 2 and 4, moving in guides 81 under the vertically-movable platen, the said slide-frame being operated as the fresh box is fed to the rear by the bar 75 contacting with the projection 83 on the slide-frame. The slide-frame carries a cam edge 84, and this engages and tilts the lever 85, pivoted to the seat, said lever being of substantially right-angular form and being arranged to lift the finished box from its seat, so that it can be discharged by contact with the new box being fed in. This lifting is desirable, as the seat fitting up into the concavity at the bottom of the box would tend to prevent the free discharge of the same. The slide-frame in the final part of its movement and just before the newly-fed box is seated raises stop-pins 85× into the path of the said newly-fed box, so that it will be stopped accurately in proper position to be seated. These pins are raised by the cam edge of the slide-frame.

While the nailing is being done the box is held in a clamp consisting, as shown in Figs. 4 and 6, of the members 90 91 opposite each other and the members 92 93, also opposite each other and operating at right angles to the members 90 91. The members 90 91 have arms 90' fitted to slide on the shafts 94, which are journaled in ears 95, depending from the cross-pieces 40 of the upper framework. Cam-disks 96 on the ends of these shafts bear on the outer faces of the arms 90, and when the cam-disks are turned they have a wedging effect on the arms of the clamp members 90 91, so as to force them into contact with the sides of the box, and this contact takes place near the upper edge of the box sides. Springs 97 retract the clamp members when the pressure from the cam-disks is removed, these springs being arranged about the shafts 94 and between the ears 95 and the arms of the clamps. These clamps comprise adjustable bearing-bars 90×, which may be set in different relations to the main body of clamps by the set-screws 98. The other clamps 92 93 are also operated from the rock-shafts 94, this being done through the eccentric disks 99 on the rock-shafts bearing against the clamp members. These clamps also comprise adjustable bearing-bars 100, connected to the main clamp members by the screws 101.

The rock-shafts 94 are operated to set the clamps through arms 102 thereon and rods 103, which extend down and are connected with the cross-head B, so that as the cross-head, with the lower plugger or seat, is moved to compress the contents of the box and position the head and lining the clamps will be set to hold the box for the nailing operation.

The machine is started by the operator introducing a box, and when once started the different sets of mechanisms are brought into action in proper order and automatically. For instance, when a box is introduced by the operator the lever 32 is operated through its roller 36 contacting with the box, and the clutch-lever 35 is operated to throw in the clutch 31. This causes the pulley 28 to drive the shaft 27 and crank 27', which latter operates the automatic feed mechanism, comprising the slide-block 78, the arm 75, and the finger 77. The clutch 31 is held in a proper length of time by the arm 25', connected to the clutch-lever 35, which arm bears on the inner face of the cam 26. This cam is on the shaft 27, and it controls the time of starting the compression of the tobacco, which is the next step in the operation after the box is seated by the automatic feed mechanism. For this purpose cam 26 operates the arm 25, and this turns the shaft 23, causing the arm 22 thereon to throw the friction-clutch disk 24 into engagement with the constantly-running pulley 21. Disk 24 is splined on the shaft 20, which, as before described, operates through gearing 19 14, pitman 13, and toggle-arms the platen for compressing the box. This compressing train of mechanism having been set in motion now controls its own action as to the length of time it will remain in operation. For this purpose said train of mechanism has the cam 55 on the shaft 4 of the gear 14, which through the arm 65' on the rock-shaft 23 and the arm 22 holds the clutch 24 in engagement the desired length of time for the compression action, which is during one half-revolution of the shaft 4 and the gear 14. The next action is the nailing, and the train of mechanism for this action is set in motion by the cam 55 of the compression train of mechanism at the completion of the compression action. This cam operates the arm 54, rocking shaft 53, and arm 52 to throw in clutch 51, so as to drive the shaft 5 from the pulley 50, said shaft 5, as before described, operating the gearing 49' 49" and the nailing mechanism through the described connections. The cam 55 of the compression train of mechanism merely starts the nailing mechanism to work, and then said mechanism is kept in operation during one revolution of the shaft 49 of the gear 49" by its own controlling-cam 56 holding the clutch 51 in operation by the arm 22' on the rock-shaft 53. The one revolution of this train of nailing mechanism, including the shaft 49 and gear 49", effects the advance and retraction of the nailing devices. The cam 55 of the compression-train holds the clutch 24 in engagement with the pulley only long enough to effect the advance of the compression mechanism. The return of the platen must now be effected, and this is done by cam 56 of the nailing train of mechanism, which in the final half of its revolution, after the nailing has been accomplished, operates the arm 65 on the rock-shaft 23 and again throws in the clutch 24 to return the platen. It will be seen from this that the machine comprises a train of feeder mechanism, a train of compression mechanism, and a train of nailing mechanism, that the feed-train has a controlling-cam to determine its duration of action, that this cam sets in action the compression-train, that said compression-train has a controlling-cam which after the compression has been effected starts the train of nailing mechanism, that said mechanism has its controlling-cam to determine its duration of action, and that said cam in turn starts the train of compression mechanism on its return movement.

Each box is discharged when completed by the feeding in of a fresh box by the automatic feed mechanism.

I claim—

1. In a machine for compressing the contents and securing the head in boxes, a movable platen and means for applying the compressing force thereto, a bed adapted, when the compressing force is exerted, to force the head within the box, and mechanism for securing the head in place while the contents are held under compression, substantially as described.

2. In a machine for compressing the contents, and securing the head in boxes, a platen carrying the box, a bed adapted to force the head within the box, nailing mechanisms mounted thereon, and means for applying the compression to the head and contents of the box, substantially as described.

3. In combination in a machine for pressing tobacco in boxes and nailing said boxes, the pressing mechanism, nailing mechanism, feed mechanism, clutch mechanism controlling the feed and means for controlling the clutch arranged in the path of the box to be moved by the same when it is introduced into the machine, substantially as described.

4. In combination, in a machine for pressing tobacco in boxes, a pressing mechanism, a driving-shaft therefor, a constantly-operating part, feed mechanism including a shaft, clutch connections between said constantly-operating part and the shaft, means for operating the drive-shaft of the pressing mechanism, a clutch and controlling connections thereto from the feed-shaft, said controlling connections being timed to be actuated at the end of the feeding movement of the feed mechanism, substantially as described.

5. In combination in a machine for pressing tobacco in boxes, a pressing mechanism, a driving-shaft therefor, a constantly-operating part, feed mechanism including a shaft, clutch connections between said constantly-operating part and the feed-shaft, means for throwing said clutch into operation automatically when a box is introduced, said means extending into the path of the box when it is introduced into the machine, and nailing mechanism, substantially as described.

6. In combination in a machine for pressing tobacco in boxes and securing the head or cover in place, a feed mechanism, a pressing mechanism, a nailing mechanism, a clutch for throwing the feed mechanism into action, a cam for controlling the duration of the feed movement, a clutch for throwing the pressing mechanism in action, connections to said clutch arranged to be started into action by the cam of the feed mechanism, a controlling cam for the pressing mechanisms, a clutch for the nailing mechanism with connections thereto from said controlling-cam, of the press for starting said clutch into action, a controlling-cam for the nailing mechanism and connections therefrom to the press-clutch for controlling the return of the press mechanism, substantially as described.

7. In combination, the feed mechanism, the compression mechanism, the nailing mechanism, driving means for each set of mechanisms, controlling connections from the feed mechanism to the driving means of the compression mechanism and controlling connections from the compression mechanism to the driving means of the nailing mechanism, substantially as described.

8. In combination in a machine for compressing tobacco in boxes, a movable seat for the box, mechanism for operating the same, a bed adapted to bear on the head of the box with beveled portions to bear on the linings, and nail-applying means arranged within the area of the box and inclined to direct the nails outward, substantially as described.

9. In combination in a machine for compressing tobacco or the like in boxes and for applying the heads and linings, mechanism for pressing said heads and linings into position within the sides of the box and nail-applying means operating to drive the nails at an incline through the linings into the box sides, said nail-applying means being arranged within the area of the box and inclined to direct the nails outward, substantially as described.

10. In combination with means for holding the box and its cover and linings, nail-applying means having drivers operating on an incline to drive the nails in an inclined position through the lining into the box, the said nail-applying devices being arranged within the area of the box.

11. In combination, with means for holding the box with its heads and linings, a plurality of nail-driving hammers arranged in inclined position to cross each other with means for operating the same to drive the nails in inclined position through the lining and into the box, substantially as described.

12. In combination with means for holding the box with its head and lining, the plurality of independently-movable cross-heads with converging guideways therefor, the nail-drivers carried by said cross-heads and means for operating the cross-heads consisting of the links 46, connected to one pair of cross-heads, the jointed pitman connected to the other pair of cross-heads and the cross-bar 45 and links forming the said connection between the said cross-bar and cross-heads, substantially as described.

13. In combination with means for holding the box with its cover and lining, a pair of oppositely-disposed cross-heads carrying nail-driving means inclined relatively to each other and the box and a second pair of cross-heads operating at right angles to the cross-heads first named and carrying inclined nail-driving devices, substantially as described.

14. In combination with the pressing and holding mechanism for the box with its head and lining, means for clamping the sides of the box, and means for nailing the lining to the box, the said nail-applying means being arranged within the area of the box to direct the nails outward, substantially as described.

15. In combination with the movable platen and the fixed part for subjecting the box, with its cover and lining to pressure, clamping means to engage the outer side of the box, mechanism for setting the said clamps operated from the movable platen and nail-driving mechanism, substantially as described.

16. In combination with means for holding the box, the nail-driving mechanism and the clamping mechanism comprising the clamps 90, 91, the rock-shafts 94 guiding said clamps, the wedge or cam disks 96 for engaging and operating the said clamps, a second pair of clamps 92, 93, with eccentrics on the rock-shafts for operating the same, and means for operating the rock-shafts, substantially as described.

17. In combination with means for holding the box under pressure, with its cover and lining, the nailing mechanism comprising nail-drivers operating on an inclination from the inside toward the outer side of the box and clamping means for engaging the outer side of the box, substantially as described.

18. In combination, with means for holding a box with its head and lining in place, automatic nailing means for driving the nails at an inclination through the lining into the box, said nail-applying means being arranged within the area of the box and inclining to direct the nails outward, substantially as described.

19. In combination with means for holding the box with its cover and lining, automatic nailing mechanism operating to drive the nails from the inner side of the box through the lining to the outer side, substantially as described.

20. In combination with the nailing mechanism, means for holding the box comprising the platen having the seat with beveled edges, the fixed bed the said bed being combined with nail-holding devices adapted to contact with the lining, substantially as described.

21. In combination with the nailing mechanism, a seat for the box adapted to fit into the bottom of the same, feeding mechanism for moving a box over the said seat, a lifting device for raising the completed box from the seat, and a cam-slide connected to and operated through the movement of the feed mechanism for operating the lifting device, substantially as described.

22. In combination with the nailing mechanism, the seat for the box adapted to fit into the bottom of the same, a stop pin or pins movable vertically in relation to the seat and means for automatically raising and lowering said stop-pin, substantially as described.

23. In combination with the nailing mechanism, the seat adapted to fit into the box-feeding mechanism, a stop for the box and a cam-slide connected to the feeding mechanism for operating the stop, substantially as described.

24. In combination with the upper fixed bed, the nailing mechanism adjacent thereto, the seat for the box, a platen combined with said seat, means for moving the seat and platen-table vertically, a feed mechanism operating in connection with the platen, said bed playing within the box and holding its contents under compression and means for operating the nailing devices while the contents are so held, substantially as described.

25. In combination, the nailing mechanism, the seat and platen for receiving the boxes, the feed-dog, the bar 75 carrying the same, the block 78 for moving the bar, means for reciprocating the platen, means for raising or lowering the platen and the seat, the said dog-carrying bar being connected with the block to slide in the same, substantially as described.

26. In combination the feed mechanism comprising the reciprocating feed device, the operating-shaft having a friction-clutch thereon, means for setting said clutch when the box is in the machine, the cam and arm for keeping said clutch in operating position, the compression mechanism, the operating-shaft therefor, the clutch controlling the same, the lever for throwing in the clutch, the shaft 23 and arm 25 for operating the said lever from the cam of the feeding mechanism, the cam 55 arranged to move with the operating-shaft of the pressure-applying mechanism, the arm 65' for holding the clutch of the compression mechanism in operation, the nailing-mechanism connection leading thereto including a clutch 51, a clutch-lever 52 controlling said clutch, a shaft 53 for operating the said lever, an arm 54 on the shaft 53 acted upon by the cam 55 of the compression mechanism for throwing said clutch 51 in operation, the shaft 49 connected with the nailing mechanism to operate therewith, the cam 56 on said shaft and the arms 22 and 65 acted upon by said cam to control the operation of the shafts 53 and 23 respectively, substantially as described.

27. In combination, in a machine for compressing the contents in boxes and securing the head and lining, a platen, a bed, one of which has movement relatively to the other, said bed having a bearing part to project within the area of the box to engage the head, and a surface to engage the lining, and nailing mechanism with means for operating the same while the head-lining and contents are under compression, substantially as described.

In testimony whereof I affix my signature in presence of two witnesses.

THOMAS J. HUMPHREY.

Witnesses:
HENRY E. COOPER,
WM. F. HALL.